United States Patent
Irish et al.

(10) Patent No.: US 9,960,608 B2
(45) Date of Patent: May 1, 2018

(54) HIGH FREQUENCY MULTI-LEVEL RECTIFICATION

(71) Applicant: QUALCOMM Incorporated, San Diego, CA (US)

(72) Inventors: Linda Stacey Irish, San Diego, CA (US); Francesco Carobolante, San Diego, CA (US); Gabriel Isaac Mayo, North Potomac, MD (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 15/061,759

(22) Filed: Mar. 4, 2016

(65) Prior Publication Data
US 2017/0256958 A1    Sep. 7, 2017

(51) Int. Cl.
*H01H 19/64* (2006.01)
*H02J 5/00* (2016.01)
(Continued)

(52) U.S. Cl.
CPC .............. *H02J 5/005* (2013.01); *H02J 7/025* (2013.01); *H02J 50/10* (2016.02); *H02J 50/12* (2016.02);
(Continued)

(58) Field of Classification Search
CPC .. H02J 5/005; H02J 50/10; H02J 50/12; H02J 7/025; H02M 1/12; H02M 7/217; H02M 7/219; H02M 7/483; H02M 2001/0058
See application file for complete search history.

(56) References Cited

U.S. PATENT DOCUMENTS 5,991,176 A    11/1999  Saada et al.
8,711,593 B2   4/2014   Ho et al.
(Continued)

FOREIGN PATENT DOCUMENTS

CN    102710153 B    11/2014

OTHER PUBLICATIONS

International Search Report and Written Opinion—PCT/US2017/017096—ISA/EPO—dated May 22, 2017—18 pgs.
(Continued)

*Primary Examiner* — Daniel Cavallari
(74) *Attorney, Agent, or Firm* — Hunter Clark PLLC

(57) ABSTRACT

A multi-level rectifier is presented that is suitable for use at high frequencies, including into MHz range such as in the 6.78 MHz band used for wireless power transfer. To maintain the proper timing or switching waveform when operating at high frequencies, a feedback loop is used. The rectification circuit includes a multi-level waveform generator circuit that generates a multi-level control waveform from the input waveform and an indication of its current. The multi-level control waveform is maintained in phase with the input waveform. A control signal generation circuit receives the multi-level control waveform and generates control signals corresponding to levels of the multi-level control waveform. A synchronous rectifier receives the input waveform and includes a plurality of switches to provide an output voltage generated from the input waveform. The switches are coupled to receive the control signals and the output voltage is a function of the multi-level control waveform.

29 Claims, 12 Drawing Sheets

(51) Int. Cl.
*H02J 50/12* (2016.01)
*H02J 7/02* (2016.01)
*H02M 1/12* (2006.01)
*H02M 7/217* (2006.01)
*H02M 7/219* (2006.01)
*H02J 50/10* (2016.01)
*H02M 7/483* (2007.01)
*H02M 1/00* (2006.01)

(52) U.S. Cl.
CPC ............ *H02M 1/12* (2013.01); *H02M 7/217* (2013.01); *H02M 7/219* (2013.01); *H02M 7/483* (2013.01); *H02M 2001/0058* (2013.01)

(56) References Cited

U.S. PATENT DOCUMENTS

| | | |
|---|---|---|
| 2007/0109824 A1 | 5/2007 | Romenesko |
| 2011/0193412 A1 | 8/2011 | Lacarnoy |
| 2014/0285027 A1 | 9/2014 | Sakamoto et al. |
| 2015/0188448 A1 | 7/2015 | Perreault et al. |
| 2015/0233987 A1 | 8/2015 | Von Novak, III et al. |
| 2017/0104368 A1* | 4/2017 | Radke .................... H02J 50/12 |

OTHER PUBLICATIONS

Krishna, K. M. J. (Jun. 2012). Design, Hardware implementation and Control of a 3-phase, 3-level Unity Power Factor Rectifier (Project Report Submitted in Partial Fulfillment of Requirement for the Degree of Master of Engineering in Electrical Engineering, Indian Institute of Science Bangalore—560 012 India). 77 pgs.

* cited by examiner

State Table for ZVS switching
And free charge pump

| ST | IH | IL | HH | HM | LM | LL |
|----|----|----|----|----|----|----|
| 0  | 1  | 0  | 0  | 1  | 0  | 1  |
| 1  | 1  | 0  | 1  | 0  | 1  | 0  |
| 2  | 0  | 1  | 1  | 0  | 1  | 0  |
| 3  | 0  | 1  | 0  | 1  | 0  | 1  |

State:  0    1    2    3

Switching
Waveform

HIGH FREQUENCY MULTI-LEVEL RECTIFICATION

FIELD

The described technology generally relates to rectifier circuits. More specifically, the disclosure is directed to multi-level rectifiers suitable for high frequency operation, such as for devices, systems, and methods related to the receiving of wireless power by a wireless power charging system.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless power charging systems, for example, may allow users to charge and/or power electronic devices without physical, electrical connections, thus reducing the number of components required for operation of the electronic devices and simplifying the use of the electronic device. Wireless charging systems and methods that efficiently and safely transfer power for charging rechargeable electronic devices are desirable.

SUMMARY

The implementations disclosed herein each have several innovative aspects, no single one of which is solely responsible for the desirable attributes of the disclosure. Without limiting the scope of the disclosure, as expressed by the claims that follow, the more prominent features will be briefly disclosed here. After considering this description, one will understand how the features of the various implementations provide several advantages over current wireless transfer systems.

A rectification circuit includes a synchronous rectifier electrically coupled to an input to receive a periodic input voltage waveform and comprising a plurality of switches. The synchronous rectifier is configured to produce a first rectifier output voltage from the periodic input voltage waveform and to output the first rectifier output voltage. The rectification circuit further includes a multi-level rectifier control circuit electrically coupled to the synchronous rectifier and configured to produce and provide control signals to the synchronous rectifier to selectively actuate the plurality of switches in different actuation configurations. The multi-level rectifier control circuit is configured to cycle through a plurality of different states within a period of the periodic input voltage waveform. Each state of the plurality of different states corresponds to respective settings of the control signals that set the actuation configurations of the plurality of switches. Each state of the plurality of different states causes a voltage level of the periodic input voltage waveform to be at one of at least three different voltage levels. The multi-level rectifier control circuit is electrically coupled to the input and is further configured to adjust timing of switching between the plurality of different states based on one or more characteristics, the one or more characteristics being of electrical current at the input, or voltage levels at the input, or a combination thereof. The one or more characteristics may correspond to levels of one or more harmonics within the periodic input voltage waveform.

A method of providing an output voltage from a periodic input voltage waveform while reducing harmonics in the periodic input voltage waveform includes rectifying, via a synchronous rectifier circuit comprising a plurality of switches, the periodic input voltage waveform to produce the output voltage. The method further includes producing control signals coupled to selectively actuate the plurality of switches in different switching configurations to cycle through a plurality of different states within a period of the periodic input voltage waveform. Each state of the plurality of different states causes a voltage level of the periodic input voltage waveform to be at one of at least three different voltage levels. The method further includes adjusting the timing of switching between the plurality of different states based on one or more characteristics, the one or more characteristics being of electrical current of the periodic input voltage waveform, or voltage levels of the periodic input voltage waveform, or a combination thereof.

A rectification apparatus includes means for rectifying a periodic input voltage waveform to produce an output voltage. The rectification apparatus further includes means for cycling through a plurality of different states within a period of the periodic input voltage waveform. Each state of the plurality of different states causes a voltage level of the periodic input voltage waveform to be at one of at least three different voltage levels. The rectification apparatus further includes means for adjusting the timing of switching between the plurality of different states based on one or more characteristics, the one or more characteristics being of electrical current of the periodic input voltage waveform, or voltage levels of the periodic input voltage waveform, or a combination thereof.

An apparatus for wireless power transfer includes a receive circuit comprising a coil configured to generate a periodic input voltage waveform in response to an external magnetic field generated by a transmitter. The apparatus further includes a multi-level rectification circuit coupled to the receive circuit to receive the periodic input voltage waveform therefrom at an input and configured to output a voltage for powering or charging a load. The multi-level rectification circuit includes a plurality of switches controlled to cause at least three voltage levels at the input of the multi-level rectification circuit. Each of the at least three voltage levels corresponding to one of a plurality of different states of the plurality of switches. The apparatus further includes a feedback circuit coupled to the receive circuit and configured to output one or more signals indicative of one or more harmonics of the periodic input voltage waveform. The apparatus further includes a multi-level rectifier control circuit configured to adjust the timing of switching between the plurality of different states based on the one or more signals indicative of the harmonics.

A rectification circuit includes a multi-level waveform generator circuit coupled to receive an input waveform and an indication of a current of the input waveform and to generate from these a multi-level control waveform, wherein the multi-level control waveform is maintained in phase with the input waveform. A control signal generation circuit is coupled to the multi-level waveform generator circuit to receive the multi-level control waveform and to generate control signals corresponding to levels of the multi-level control waveform. A synchronous rectifier is coupled to receive the input waveform and includes a plurality of switches to provide a first rectifier output voltage generated from the input waveform. The plurality of switches are coupled to receive the control signals from the control signal generation circuit and the first rectifier output voltage is a function of the multi-level control waveform.

In a method of providing an output voltage form an input waveform, an indication of the current and voltage of the input waveform is received. A multi-level control waveform that maintains a phase of the multi-level control waveform relative to the input waveform is generated from the input waveform. A plurality of control signals are generated in response to the levels of the multi-level control waveform and the input waveform and the plurality of control signals are received at a synchronous rectifier. The output voltage is generated from the input waveform in response to the control signals.

A multi-level rectifier includes a waveform generator means, control signal generating means, and rectification means. The waveform generator means generates a multi-level control waveform from an input waveform that maintains a phase relationship relative to the input waveform based upon an indication of current of the input waveform and voltage of the input waveform. The control signal generating means is for generating a set control signals from the levels of the multi-level control waveform. The rectification means is for generating an output voltage from the input waveform in response to the control signals.

A receive circuit for wireless power transfer includes a receive coupler and a rectification circuit coupled to the receive coupler to receive an input waveform from the receive coupler. The rectification circuit includes a multi-level waveform generator circuit coupled to receive the input waveform and an indication of a current of the input waveform and to generate from these a multi-level control waveform, wherein the multi-level control waveform is maintained in phase with the input waveform. A control signal generation circuit is coupled to the multi-level waveform generator circuit to receive the multi-level control waveform and to generate control signals corresponding to levels of the multi-level control waveform. A synchronous rectifier is coupled to receive the input waveform and includes a plurality of switches to provide a first rectifier output voltage generated from the input waveform. The plurality of switches are coupled to receive the control signals from the control signal generation circuit and the first rectifier output voltage is a function of the multi-level control waveform.

The following detailed description together with the accompanying drawings will provide a better understanding of the nature and advantages of the disclosure.

BRIEF DESCRIPTION OF THE DRAWINGS

The above-mentioned aspects, as well as other features, aspects, and advantages of the disclosure will now be described in connection with various implementations, with reference to the accompanying drawings. The illustrated implementations, however, are merely examples and are not limiting. Throughout the drawings, similar symbols typically identify similar components, unless context dictates otherwise. The relative dimensions of the following figures may not be drawn to scale.

DETAILED DESCRIPTION

Figure 1:
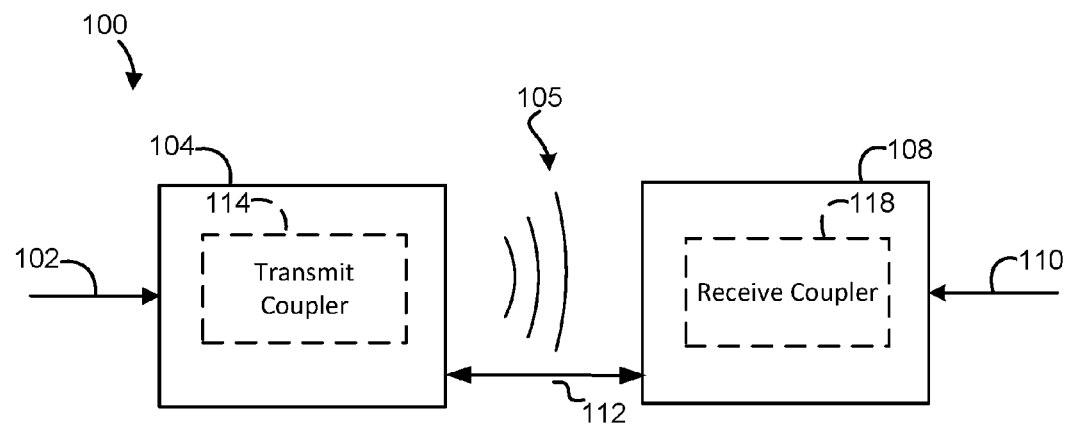
FIG. 1 is a functional block diagram of a wireless power transfer system, in accordance with one exemplary embodiment.

Various aspects of the novel systems, apparatuses, and methods are described more fully hereinafter with reference to the accompanying drawings. The teachings of this disclosure may, however, be embodied in many different forms and are not limited to any specific structure or function presented throughout this disclosure. Rather, these aspects are provided so that this disclosure will be thorough and complete, and will fully convey the scope of the disclosure to those skilled in the art. The scope of the disclosure includes any aspect of the novel systems, apparatuses, and methods disclosed herein, whether implemented independently of or combined with any other aspect. For example, an apparatus may be implemented or a method may be practiced using any number of the aspects set forth herein. In addition, the scope of the disclosure includes such an apparatus or method which is practiced using other structure, functionality, or structure and functionality in addition to or other than the various aspects set forth herein. Any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not limited to particular benefits, uses, or objectives. Rather, aspects of the disclosure are to be broadly applicable to different wireless power transfer technologies and system configurations, some of which are illustrated by way of example in the figures and in the following description of the preferred aspects. The detailed description and drawings are merely illustrative of the disclosure rather than limiting, the scope of the disclosure being defined by the appended claims and equivalents thereof.

In the following detailed description, reference is made to the accompanying drawings, which form a part of the present disclosure. The illustrative embodiments described in the detailed description, drawings, and claims are not limiting. Other embodiments may be utilized, and other changes may be made, without departing from the spirit or scope of the subject matter presented here. The aspects of the present disclosure, as generally described herein, and illustrated in the figures, can be arranged, substituted, combined, and designed in a wide variety of different configurations, all of which are explicitly contemplated and form part of this disclosure.

The terminology used herein is for the purpose of describing particular embodiments only and is limiting of the disclosure. If a specific quantity of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. The terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer.

FIG. 1 is a functional block diagram of a wireless power transfer system 100, in accordance with one exemplary embodiment. Input power 102 is provided to a transmit coupler 114 of a transmitter 104 from a power source (not shown in this figure) to generate a wireless (e.g., magnetic or electromagnetic) field 105 for performing energy transfer. A receive coupler 118 of a receiver 108 (e.g., a cellular phone, a GPS unit, a watch, a mobile media device, a laptop computer, a key fob, or the like) couples to the wireless field 105 and generates an output power 110 for storing or consumption by a device (not shown in this figure) coupled to the output power 110. Both the transmitter 104 and the receiver 108 are separated by a distance 112.

The receiver 108 may wirelessly receive power when the receive coupler 118 is located in the wireless field 105 generated by the transmit coupler 114. The transmit coupler 114 of the transmitter 104 may transmit energy to the receive coupler 118 via the wireless field 105. The receive coupler 118 of the receiver 108 may receive or capture the energy transmitted from the transmitter 104 via the wireless field 105. The wireless field 105 corresponds to a region where energy output by the transmit coupler 114 may be captured by the receive coupler 118. In some embodiments, the wireless field 105 may correspond to the "near-field" of the transmitter 104. The "near-field" may correspond to a region in which there are strong reactive fields resulting from the currents and charges in the transmit coupler 114 that minimally radiate power away from the transmit coupler 114 in the far field. The near-field may correspond to a region that is within about one wavelength (or a fraction thereof) of the transmit coupler 114.

In one exemplary embodiment, the wireless field 105 may be a magnetic field and the transmit coupler 114 and the receive coupler 118 are configured to inductively transfer power. The transmit coupler and the receive coupler 118 may further be configured according to a mutual resonant relationship. When the resonant frequency of the receive coupler 118 and the resonant frequency of the transmit coupler 114 are substantially the same or very close, transmission losses between the transmitter 104 and the receiver 108 are reduced. Resonant inductive coupling techniques may thus allow for improved efficiency and power transfer over various distances and with a variety of coupler configurations. When configured according to a mutual resonant relationship, in an embodiment, the transmitter 104 outputs a time varying magnetic field with a frequency corresponding to the resonant frequency of the transmit coupler 114. When the receive coupler 118 is within the wireless field 105, the time varying magnetic field may induce a current in the receive coupler 118. When the receive coupler 118 is configured to resonate at the frequency of the transmit coupler 114, energy may be more efficiently transferred. The alternating current (AC) induced in the receive coupler 118 may be rectified to produce direct current (DC) that may be provided to charge or to power a load (not shown).

Figure 2:
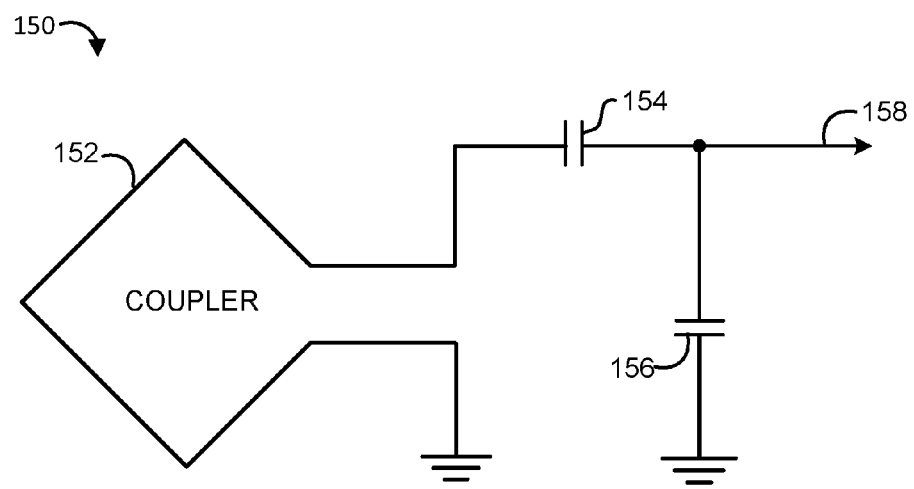
FIG. 2 is a schematic diagram of a portion of transmit circuitry or receive circuitry in accordance with exemplary embodiments.

FIG. 2 is a schematic diagram of a portion of transmit circuitry or receive circuitry, in accordance with exemplary embodiments. As illustrated in FIG. 2, the transmit or receive circuitry 250 may include a coupler 252. The coupler 252 may also be referred to herein or be configured as a "magnetic" coupler, an antenna, or an induction coil. The term "coupler" generally refers to a component that wirelessly outputs or receives energy for coupling to another "coupler." The coupler 252 may also be referred to as a coil or inductor of a type that is configured to wirelessly output or receive power. As used herein, the coupler 252 is an example of a "power transfer component" of a type that is configured to wirelessly output and/or receive power. The coupler 252 may include an air core or a physical core such as a ferrite core (not shown in this figure).

The coupler 252 may form a portion of a resonant circuit configured to resonate at a resonant frequency. The resonant frequency of the coupler 252, which can be a loop coupler or magnetic coupler, is based on the inductance and capacitance. Inductance may be simply the inductance created by the coupler 252, whereas, a capacitor may be added to create a resonant structure at a desired resonant frequency. As a non-limiting example, a capacitor 254 and a capacitor 256 are added to the transmit or receive circuitry 250 to create a resonant circuit that resonates at a desired frequency of operation. Accordingly, for larger diameter couplers, the size of capacitance needed to sustain resonance may decrease as the diameter or inductance of the loop increases. Other resonant circuits formed using other components are also possible.

As another non-limiting example, a capacitor (not shown) may be placed in parallel between the two terminals of the circuitry 250. For transmit couplers, a signal 258, with a frequency that substantially corresponds to the resonant frequency of the coupler 252, may be an input to the coupler 252. For receive couplers, the signal 258, with a frequency that substantially corresponds to the resonant frequency of the coupler 252, may be an output from the coupler 252.

Figure 3:
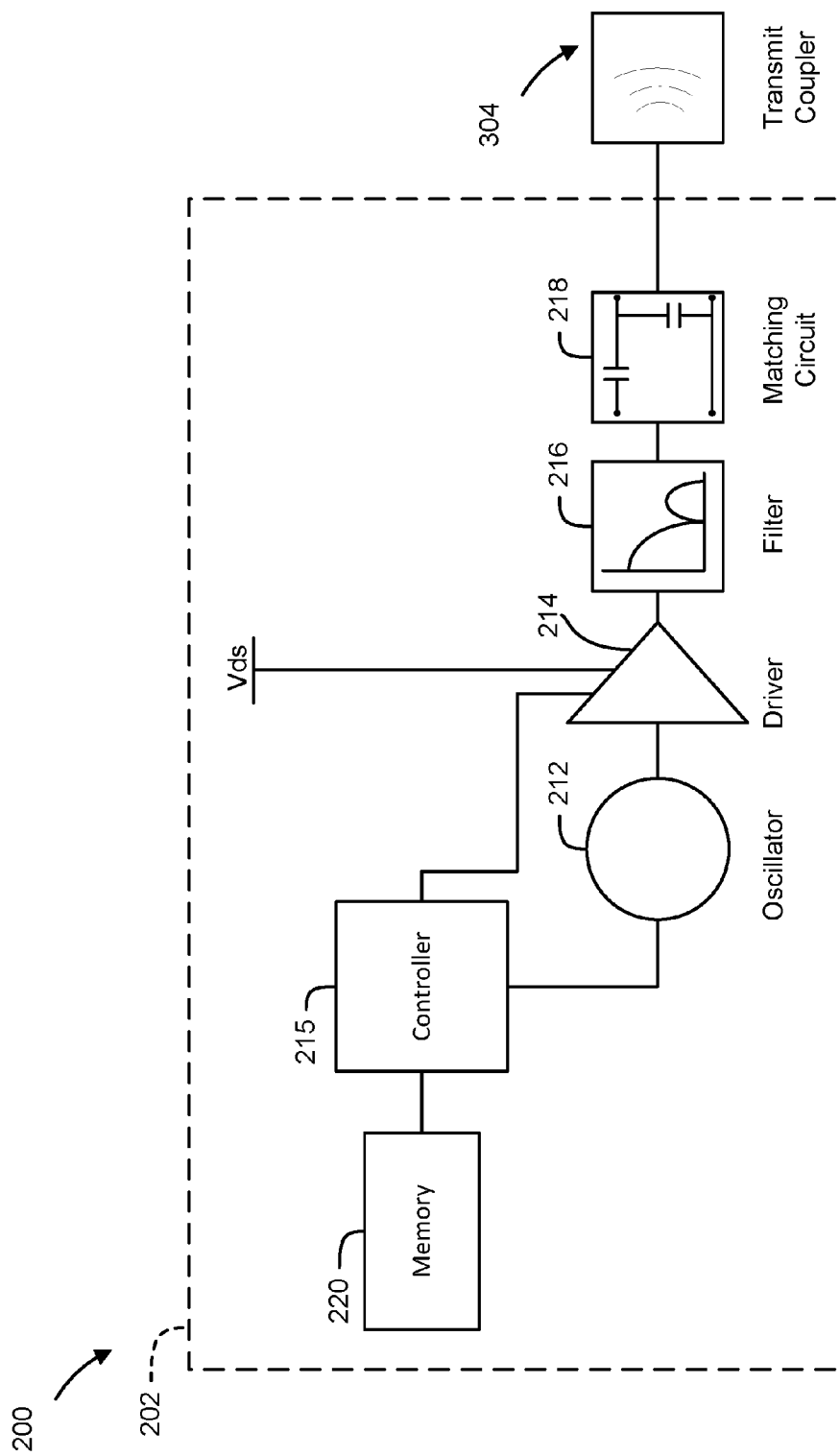
FIG. 3 is a simplified functional block diagram of a transmitter that may be used in an inductive power transfer system, in accordance with exemplary embodiments.

FIG. 3 is a simplified functional block diagram of a transmitter 300 that may be used in an inductive power transfer system, in accordance with exemplary embodiments. The transmitter 300 includes transmit circuitry 302 and a transmit coupler 304 operably coupled to the transmit circuitry 302. In some embodiments, the transmit coupler 304 is or may be referred to as a coil (e.g., an induction coil). In an exemplary embodiment, the transmit coupler 304 is configured to generate an electromagnetic or magnetic field within a charging region. In an exemplary embodiment, the transmit coupler 304 is configured to transmit power to a receiver device within the charging region at a power level sufficient to charge or power the receiver device (e.g., on the order of 1 or more watts such as 1 watt, 5 watts, 10 watts, 50 watts, 100 watts, etc.). For example, a wireless phone charging station might transmit such that a receive device can obtain 5 watts or a laptop charging station might provide 120 watts.

The transmit circuitry 302 may receive power through a number of power sources (not shown). The transmit circuitry 302 may include various components configured to drive the transmit coupler 304. In some exemplary embodiments, the transmit circuitry 302 may be configured to adjust the transmission of wireless power based on the presence and constitution of the receiver devices as described herein. As such, the transmit circuitry 302 may provide wireless power efficiently and safely.

The transmit circuitry 302 includes a controller 315. In some embodiments, the controller 315 may be a microcontroller or a processor. In other embodiments, the controller 315 may be implemented as an application-specific integrated circuit (ASIC). The controller 315 may be operably connected, directly or indirectly, to each component of the transmit circuitry 302. The controller 315 may be further configured to receive information from each of the components of the transmit circuitry 302 and perform calculations based on the received information. The controller 315 may be configured to generate control signals for each of the components that may adjust the operation of that component. As such, the controller 315 may be configured to adjust the power transfer based on a result of the calculations performed by it.

The transmit circuitry 302 may further include a memory 320 operably connected to the controller 315. The memory 320 may comprise random-access memory (RAM), electrically erasable programmable read only memory (EEPROM), flash memory, or non-volatile RAM. The memory 320 may be configured to temporarily or permanently store data for use in read and write operations performed by the controller 315. For example, the memory 320 may be configured to store data generated as a result of the calculations of the controller 315. As such, the memory 320 allows the controller 315 to adjust the transmit circuitry 302 based on changes in the data over time.

The transmit circuitry 302 may further include an oscillator 312 operably connected to the controller 315. The oscillator 312 may be configured to generate an oscillating signal at the operating frequency of the wireless power transfer. For example, in some exemplary embodiments, the oscillator 312 is configured to operate at the 6.78 MHz ISM frequency band. The controller 315 may be configured to selectively enable the oscillator 312 during a transmit phase (or duty cycle). The controller 315 may be further configured to adjust the frequency or a phase of the oscillator 312 which may reduce out-of-band emissions, especially when transitioning from one frequency to another. As described above, the transmit circuitry 302 may be configured to provide an amount of charging power to the transmit coupler 304, which may generate energy (e.g., magnetic flux) about the transmit coupler 304.

The transmit circuitry 302 further includes a driver circuit 314 operably connected to the controller 315 and the oscillator 312. The driver circuit 314 may be configured to drive the signals received from the oscillator 312, as described above.

The transmit circuitry 302 may further include a low pass filter 316 operably connected to the transmit coupler 304. In some exemplary embodiments, the low pass filter 316 may be configured to receive and filter an analog signal of current and an analog signal of voltage generated by the driver circuit 314. In some embodiments, the low pass filter 316 may alter a phase of the analog signals. The low pass filter 316 may cause the same amount of phase change for both the current and the voltage, canceling out the changes. In some embodiments, the controller 315 may be configured to compensate for the phase change caused by the low pass filter 316. The low pass filter 316 may be configured to reduce harmonic emissions to levels that may prevent self-jamming. Other exemplary embodiments may include different filter topologies, such as notch filters that attenuate specific frequencies while passing others.

The transmit circuitry 302 may further include a fixed impedance matching circuit 318 operably connected to the low pass filter 316 and the transmit coupler 304. The fixed impedance matching circuit 318 may be configured to match the impedance of the transmit circuitry 302 (e.g., 50 ohms) to the impedance of the transmit coupler 304. Other exemplary embodiments may include an adaptive impedance match that may be varied based on measurable transmit metrics, such as the measured output power to the transmit coupler 304 or a DC current of the driver circuit 314.

The transmit circuitry 302 may further comprise discrete devices, discrete circuits, and/or an integrated assembly of components.

Transmit coupler 304 may be implemented as an antenna strip with the thickness, width and metal type selected to keep resistive losses low. In one embodiment, the transmit coupler 304 can generally be configured for association with a larger structure such as a table, mat, lamp or other less portable configuration. In an exemplary application where the transmit coupler 304 may be larger in size relative to the receive coupler, the transmit coupler 304 will not necessarily need a large number of turns to obtain a reasonable inductance to form a portion of a resonant circuit tuned to a desired operating frequency.

Figure 4:
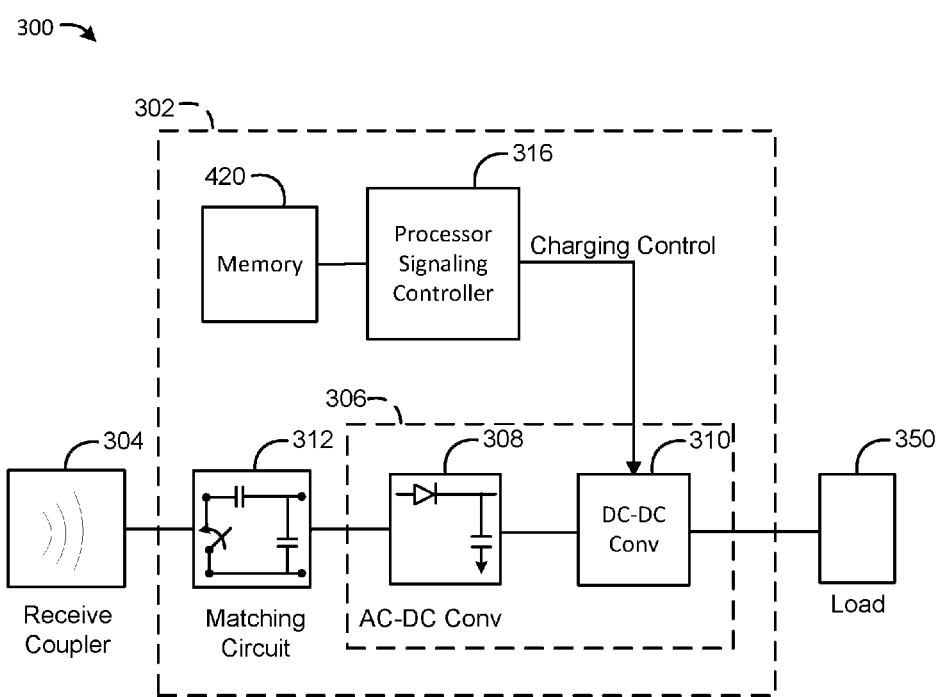
FIG. 4 is a simplified functional block diagram of a receiver that may be used in the inductive power transfer system, in accordance with exemplary embodiments.

FIG. 4 is an exemplary block diagram of a receiver 400 that may be used in the inductive power transfer system, in accordance with an embodiment. A receiver 400 includes a receive circuitry 402, a receive coupler 404, and a load 450. The receive circuitry 402 is electrically coupled to the load 450 for providing received charging power thereto. It should be noted that receiver 400 is illustrated as being external to load 450 but may be integrated into load 450. The receive coupler 404 is operably connected to the receive circuitry 402. The receive coupler 404 may be configured as the receive coupler 418 as described above in reference to FIG. 2. In some embodiments, the receive coupler 404 may be tuned to resonate at a frequency similar to a resonant frequency of the transmit coupler 304, or within a specified range of frequencies, as described above. The receive coupler 404 may be similarly dimensioned with transmit coupler 304 or may be differently sized based upon the dimensions of the load 450. The receive coupler 404 may be configured to couple to the magnetic field generated by the transmit coupler 304, as described above, and provide an amount of received energy to the receive circuitry 402 to power or charge the load 450.

The receive circuitry 402 is operably coupled to the receive coupler 404 and the load 450. The impedance presented to the receive coupler 404 by the receive circuitry 402 may be configured to match an impedance of the receive coupler 404 (e.g., via a matching circuit schematically represented at 412), which increase efficiency. The receive circuitry 402 may be configured to generate power based on the energy received from the receive coupler 404. The receive circuitry 402 may be configured to provide the generated power to the load 450. In some embodiments, the receiver 400 may be configured to transmit a signal to the transmitter 300 indicating an amount of power received from the transmitter 300.

The receive circuitry 402 includes a processor-signaling controller 416 configured to coordinate the processes of the receiver 400. The receive circuitry 402 may further include a memory 420 operably connected to the processor-signaling controller 416. The memory 420 may comprise random-access memory (RAM), electrically erasable programmable read only memory (EEPROM), flash memory, or non-volatile RAM. The memory 420 may be configured to temporarily or permanently store data for use in read and write operations performed by the processor-signaling controller 416. For example, the memory 420 may be configured to store data generated as a result of the calculations of the processor-signaling controller 416. As such, the memory 420 allows the processor-signaling controller 416 to adjust the receive circuitry 402 based on changes in the data over time.

The receive circuitry 402 includes power conversion circuitry 406 for converting a received energy source into charging power for use by the load 450. The power conversion circuitry 406 includes an AC-to-DC converter 408 coupled to a DC-to-DC converter 410. The AC-to-DC converter 408 rectifies the AC signal from the receive coupler 404 into DC power while the DC-to-DC converter 410 converts the rectified energy signal into an energy potential (e.g., voltage) that is compatible with the load 450. Various AC-to-DC converters 408 are contemplated including partial and full rectifiers, regulators, bridges, doublers, as well as linear and switching converters.

The receive circuitry 402 may further include the matching circuit 412 configured to connect the receive coupler 404 to the power conversion circuitry 406 or alternatively for disconnecting the power conversion circuitry 406 from the receive coupler 204. Disconnecting the receive coupler 404 from the power conversion circuitry 406 may not only suspend charging of the load 450, but also changes the "load" as "seen" by the transmitter 300 (FIG. 3).

Considering the receive circuitry 402 further, at least a portion of the AC-to-DC converter 408 of FIG. 4 will include a rectifier. Rectifiers used in wireless power, such as those of the full bridge or voltage doubler type, generate odd harmonics of the waveform being rectified. Wireless power receivers also need to operate over a wide range of power levels and DC output voltages that will vary depending on the coupling, transmitter power and the DC load placed on the rectifier. Low order harmonics, such as the third and the fifth order harmonics, can be difficult to filter without bulky, lossy and expensive components. Consequently, wireless transfer receive circuitry 402 would benefit from rectifiers that did not generate these lower order odd harmonic to the same degree, thereby reducing the need for the filtering out of these harmonics. A multi-level rectifier, in which the periodic input voltage waveform for the rectifier has three or more levels, rather than just a high and low level in each cycle (e.g., each period of the periodic input voltage waveform), can help to eliminate these low order harmonics by reducing or eliminating the generation of them in the first place, greatly simplifying electromagnetic interference (EMI) compliance.

The number of levels in a multi-level rectifier can be three, four, five, or more. A number of examples will be explained in detail for a three-level rectifier, but upon reading this disclosure, the uses for more than three levels should be apparent. Many of the examples herein describe the use of a multi-level rectifier in the context of wireless power transfer, as might be used in wireless charging of a battery. It should be understood that these methods and apparatus described herein might more generally be applied in other high-frequency applications of rectification or where there is a desire for more accuracy than might otherwise be provided that would otherwise be obtained using previous techniques, such as running the rectifier in an open-loop arrangement.

An example of where a multi-level rectifier could be used is in the multi-megahertz range, such as the 6.78 MHz ISM frequency band used in wireless charging applications. In such applications, the receive circuit may present the rectifier with a highly variable input, in terms of both voltage and current, depending upon the specifics of the transmitter and how strongly the receiving and transmitting elements are coupled, so that the rectifier may need to handle a voltage range of, say, 4:1 and a wide load current range. Changes in load or input voltage can alter the timing of the switches needed to keep operation under zero voltage switching (ZVS) and timed correctly to eliminate undesired harmonics.

Timing errors can occur with multi-level rectifiers. The sort of errors in timing that can result in open-loop operation can greatly reduce effectiveness of harmonic cancellation. Propagation delays of the system clock can introduce timing errors. Timing errors might also originate from transistor turn-on and turn-off. Dead time between the turn-off of one transistor to the turn-on of the opposing transistor allows the voltage on the transistor drain to change at different rates depending on load.

A multi-level rectifier can be used to eliminate the third harmonic and, as explained herein, timing can be adjusted to keep the desired harmonic cancellation functioning optimally. At high frequencies, the timing of the waveform can be altered in order to improve on the harmonic due to changes in the waveform. Using feedback methods as described herein, the waveform can be corrected. The second harmonic, if present due to imperfect timing, can also be corrected. More specifically, feedback used here to determine the control signals for the multi-level rectifier is the signal at the input of the rectifier, as it is the harmonics on this input that are the main interest here. As such, the following is not looking at a closed loop on the output voltage in order to control the output voltage; however, as the operation of the rectifier is reflected in the harmonics generated at its input, the term feedback is still used.

Figure 5:
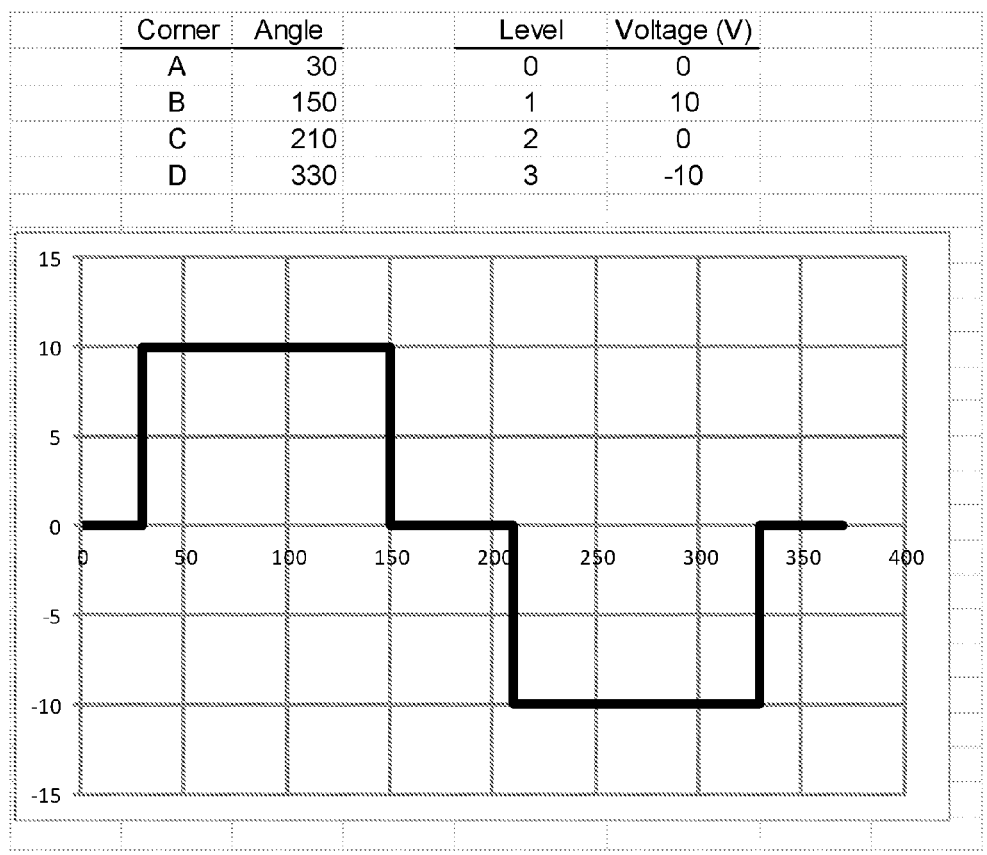
FIG. 5 illustrates a switching waveform of a three-level rectifier.
Figure 9:
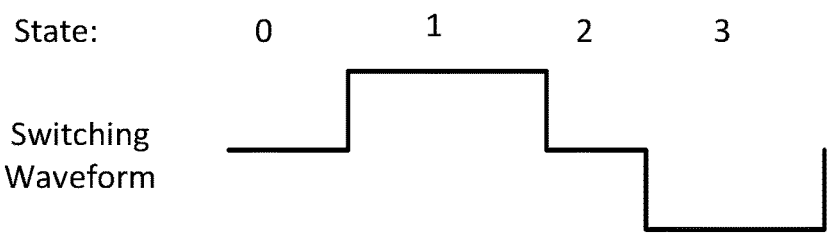
FIG. 9 illustrates a cycle of a three-level waveform with its states labelled.

FIG. 5 illustrates a three-level input voltage waveform at an input to a multi-level rectifier circuit. The control signal for the switches of the rectifier can be generated to cause the three-level input voltage waveform. FIG. 9 illustrates the relationship of the switching waveforms to the control signals that applied the switches for the embodiment of FIG.

8 to selectively actuate the switches in different actuation configurations. Specifically, one cycle of a three-level waveform for controlling a rectifier is shown. In FIG. 5, the y-axis represents the voltage at the output of a three-level rectifier and the x-axis represents the phase of the waveform. As illustrated, the voltage at the output rises from ground to a high state at a first phase angle, then at a second phase angle goes from the high state to an intermediate state (e.g., the high state is higher than the intermediate state), then at a third phase angle goes from the intermediate state to a low state (e.g., the low state is lower than the intermediate state), and then at a fourth phase angle goes from the low state back to ground. In the example illustrated, the first through fourth phase angles are 30 degrees, 150 degrees, 210 degrees, and 330 degrees, respectively, but other phase angles might be used instead. In this example, the high state corresponds to an output of 10 V, the intermediate state to an output of 0 V, and the low state to an output of −10 V, but other voltages might be used instead.

Figure 6:
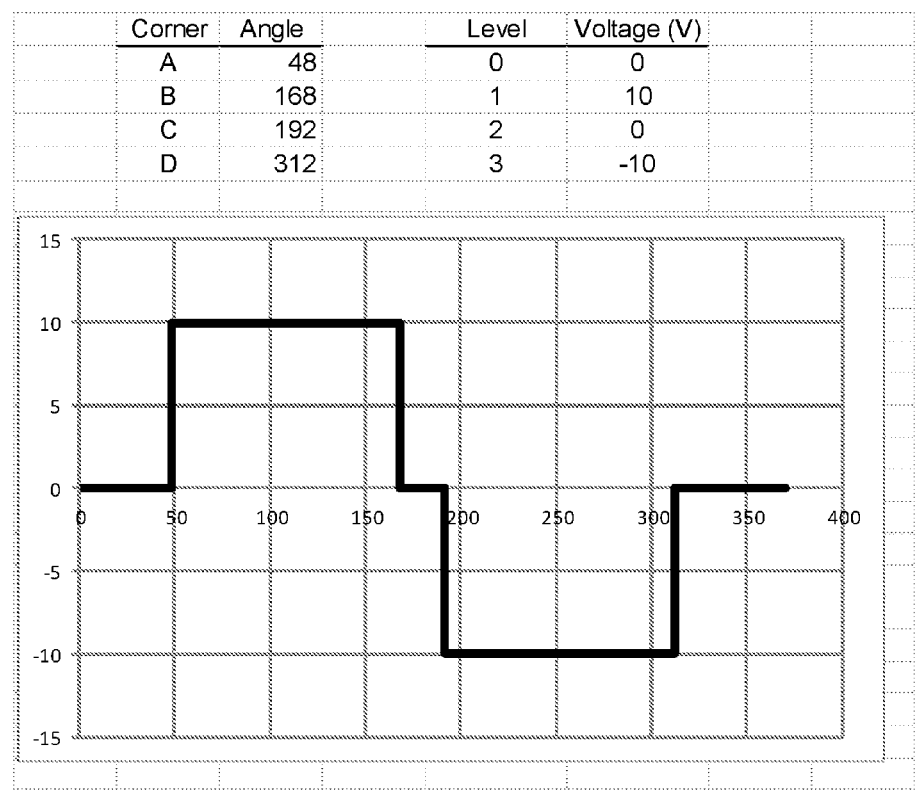
FIG. 6 illustrates a multi-level waveform with third and fifth harmonics cancelled but even harmonics present.
Figure 7:
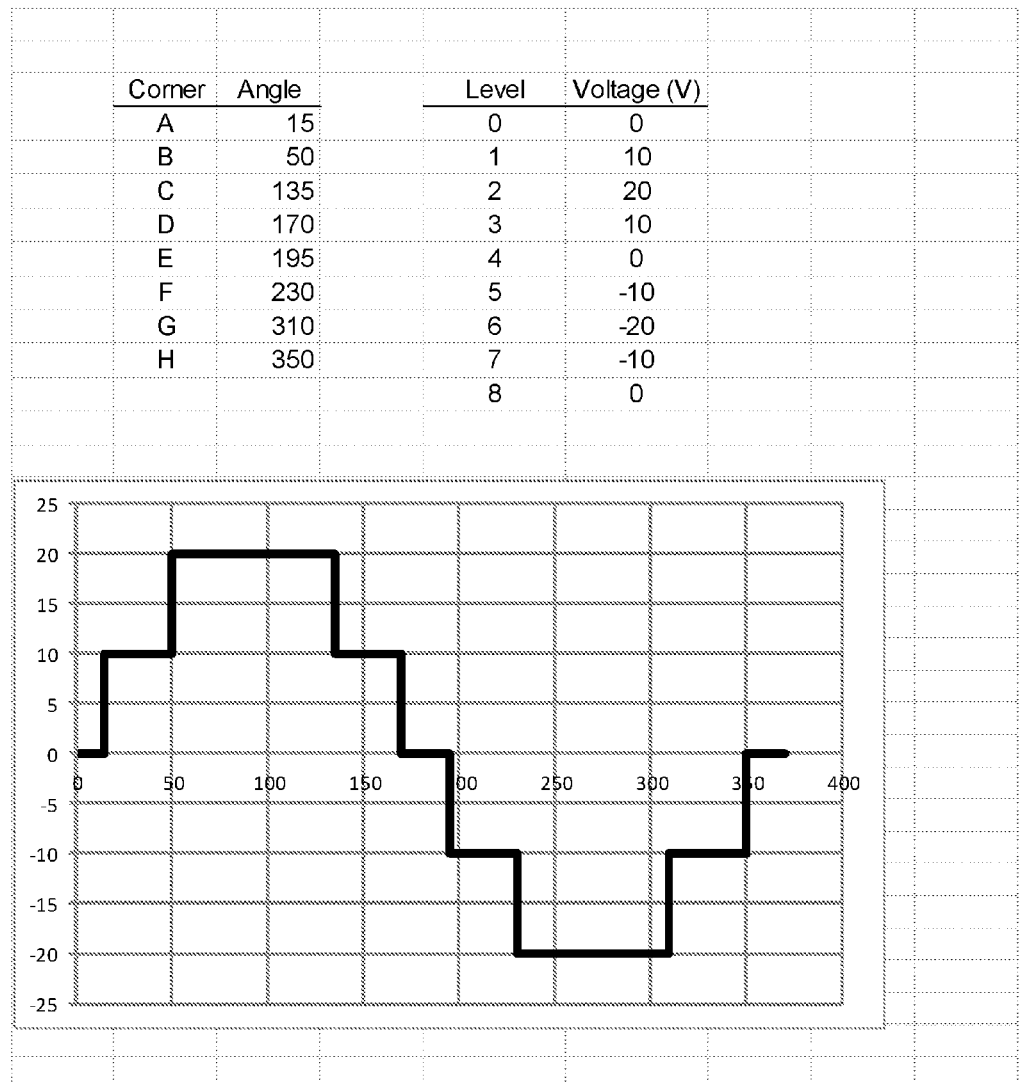
FIG. 7 illustrates a waveform from a full bridge connected three-level rectifier timed to eliminate second, third, fourth, fifth, sixth, eighth, and ninth harmonics.

FIG. 6 shows another example of a switching waveform and phase angles of a multi-level waveform that can used to control a synchronous rectifier so that the third and fifth harmonics are cancelled, but even harmonics are present. Since there are still limits to the amount of acceptable electromagnetic interference (EMI) at the second and fourth harmonics, it may be desirable to remove these too. By taking the waveform in FIG. 6 and subtracting a 180 degree phase shifted version of it, the even harmonics disappear because the waveform is now symmetrical. This is illustrated in FIG. 7 that shows a waveform from a bridge connected three-level rectifiers timed to eliminate second, third, fourth, fifth, sixth, eighth, and ninth harmonics.

It can be seen in FIG. 5 that the second and third harmonic is largely absent, but the fifth harmonic is still there. In a wireless power application at the 6.78 MHz ISM frequency band application, as the second and the fourth harmonic fall on ISM bands, it may be preferable to cancel the fifth harmonic rather than the second harmonic, as illustrated in FIG. 6.

To obtain and maintain the correct timing, especially at high frequencies, such as 6.78 MHz, something other than an open-loop arrangement might be needed. Timing can vary due to propagation delays in the gate drivers, logic and analog circuitry needed to create the waveform. A feedback mechanism is used for correcting the harmonics since the required harmonic rejection cannot readily be achieved without feedback to correct the timing waveform at the frequencies involved.

Figure 8:
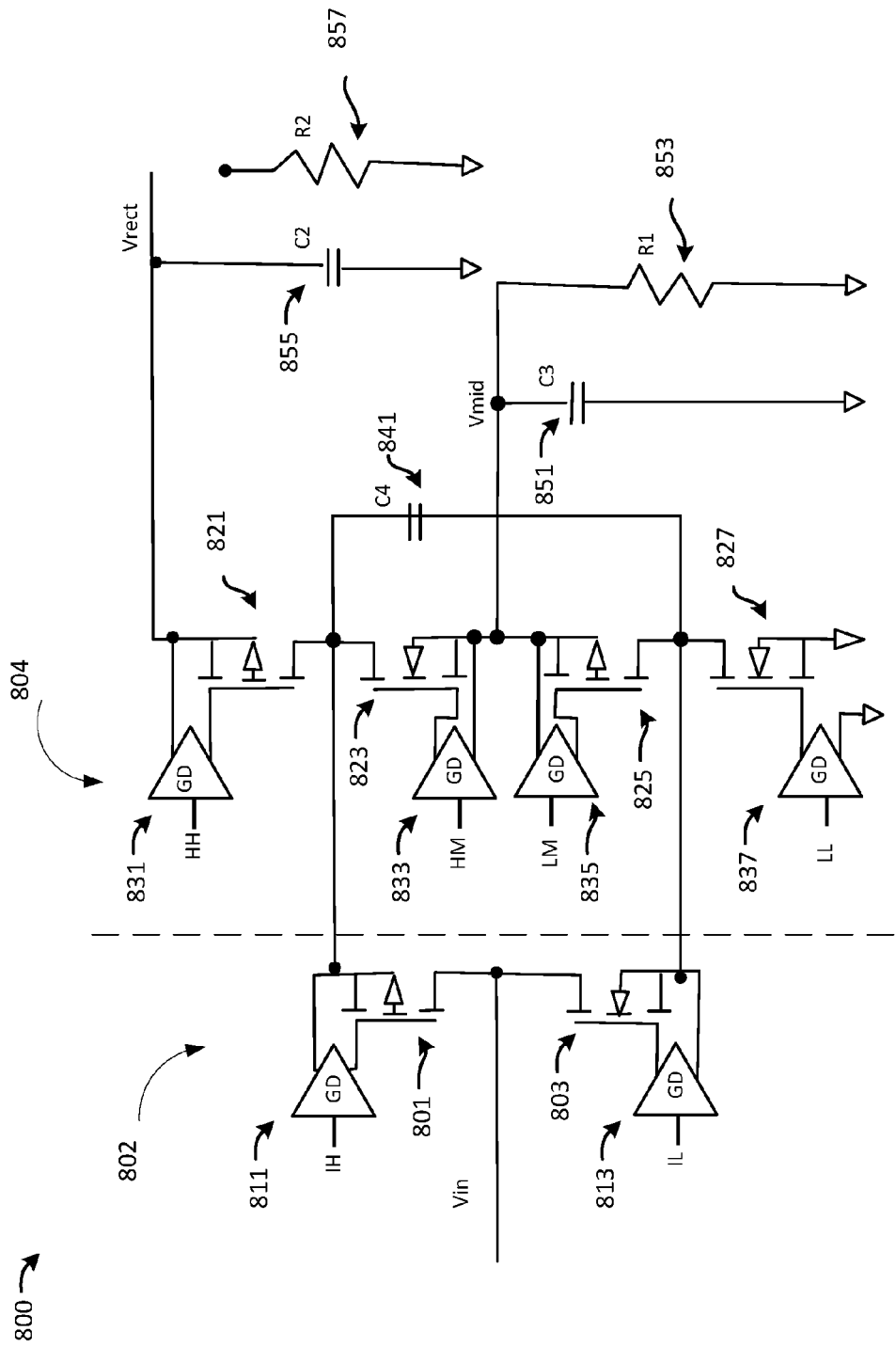
FIG. 8 shows an example of an embodiment of asynchronous rectifier circuit that can be used for a three-level rectifier.
Figure 11:
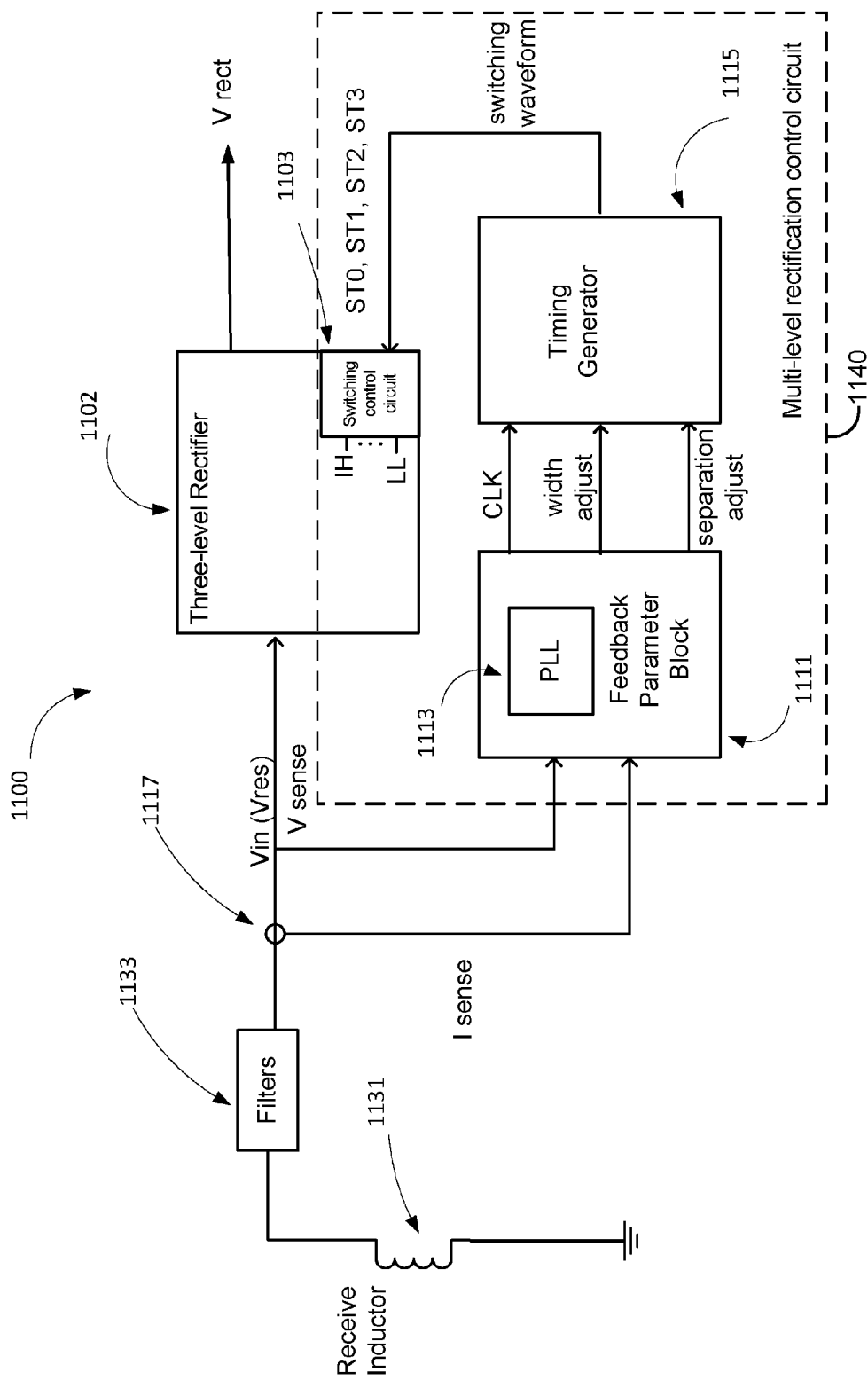
FIG. 11 shows a block diagram for an exemplary embodiment of a three-level rectifier with harmonic control.
Figure 12:
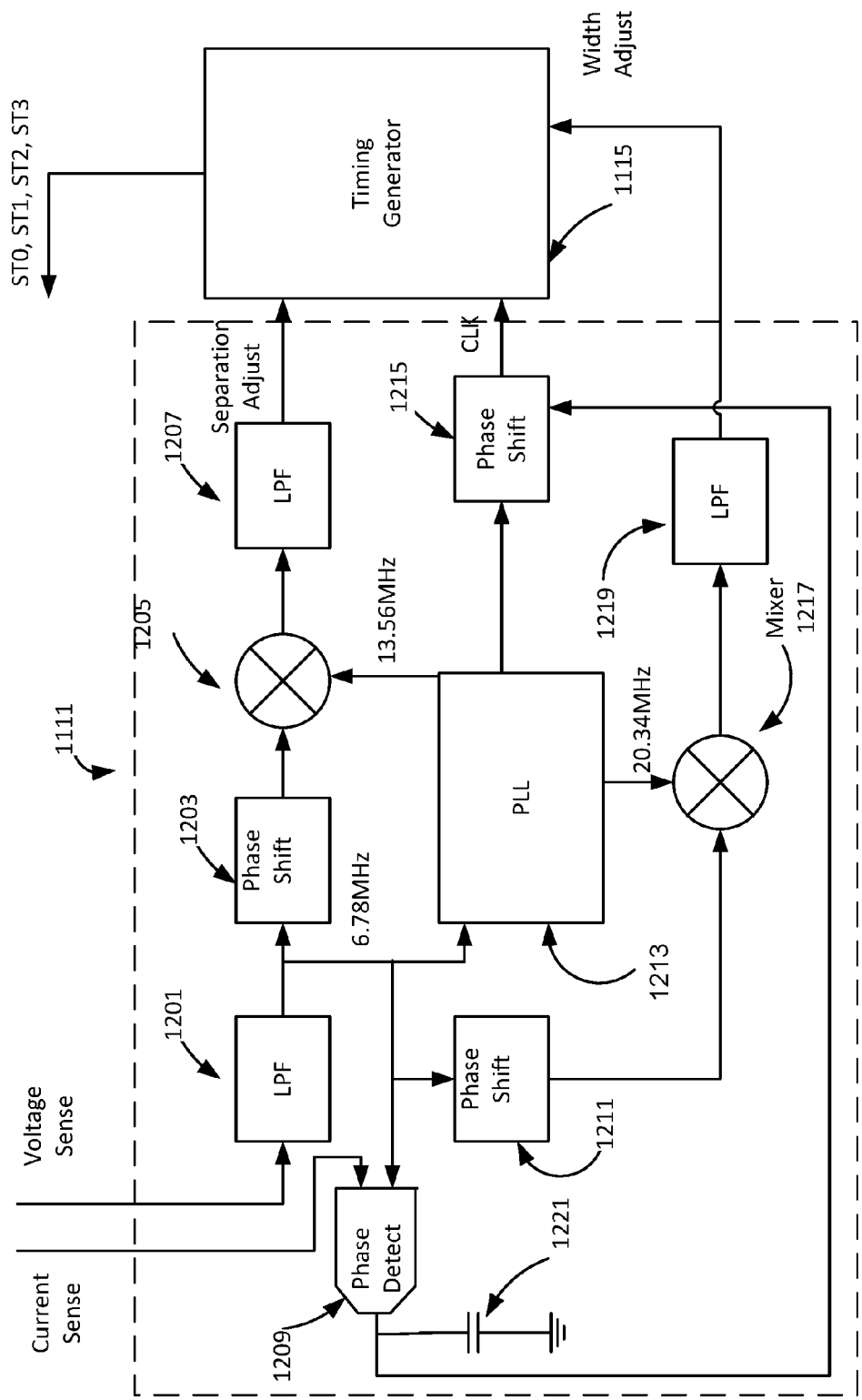
FIG. 12 provides more detail of the circuitry of FIG. 11 for providing the feedback parameters.

FIG. 8 shows an example of an active or synchronous rectifier circuit that can be used as a three-level rectifier and also includes a divide-by-2 charge pump. FIG. 11 shows a block diagram for an exemplary embodiment of a three-level rectifier with harmonic control. FIG. 12 provides more detail of circuitry for providing feedback parameters. The topology shown in FIG. 8 can be used with the system of FIG. 11 to generate the timing of the different levels of the input voltage waveform shown in FIG. 5 and FIG. 6. However it is noted that other rectifier topologies are also contemplated. For example, a full bridge connected version of the topology of FIG. 8 can be used to create the waveform in FIG. 7.

FIG. 8 illustrates an example of a multi-level rectifier, such as could be used for the three-level rectifier 1102 of FIG.11 below. As shown in FIG. 8, rectifier 800 includes a front section 802 and a back section 804. The input AC waveform (e/g., periodic input voltage waveform) to rectifier 800 is received at the node Vin and an output of rectifier 800 is provided at a node Vrect. Control inputs to rectifier 800 include IH, IL, HH, HM, LM, and LL, where each of the control inputs is an input to an associated gate driver (which are each labelled "GD" in FIG. 8). Front section 802 includes two transistors 801 and 803. Back section 804 of rectifier 800 includes a transistor 821, a transistor 823, a transistor 825, and a transistor 827.

The gate of transistor 801 is driven by a gate driver 811 (the gate driver of input IH) and the gate of transistor 803 is driven by a gate driver 813 (the gate driver of input IL). These two front section transistors 801 and 803 are in series and the signal from node Vin is applied to the node between these two front section transistors.

The back section transistors form a set of switches in series between the output node Vrect and ground. The gate of transistor 821 is driven by a gate driver 831 (the gate driver of input HH). The gate of transistor 823 is driven by a gate driver 833 (the gate driver of input HM). The gate of transistor 825 is driven by a gate driver 835 (the gate driver of input LM). The gate of transistor 827 is driven by a gate driver 837 (the gate driver of input LL).

Transistor 821 is coupled between output Vrect and a first intermediate node. Transistor 801 of the front section is also coupled to that first intermediate node. Transistor 823 is coupled between the first intermediate node and a node VMID. Transistor 825 is coupled between node VMID and a second intermediate node. Transistor 803 of the front section is also coupled to that second intermediate node. Transistor 827 is coupled between the second intermediate and ground. A capacitor C4 841 is coupled between the first and second intermediate nodes. Capacitor 841 is therefore "seen" as being between the outputs of transistors 801 and 803 of the front section.

The output of the rectifier is taken at Vrect, which is connected to ground through a smoothing capacitor C2 855. A load on rectifier 800 is represented by R2 857, which can be connected at Vrect (shown unconnected in FIG. 8). The multi-level rectifier topology gives a free charge pump that can be used to select two different output voltages, where Vrect is the full output voltage, that can be connected to a load represented by R2 857, and VMID is one half of the output voltage, that can be connected to the load represented by R1 853. Placing a load on the charge pump can increase the harmonics of the rectifier, but only slightly. Having the choice of the VMID or Vrect allows for selection of whichever output is closer to the desired level. The alternate or secondary output can be taken at VMID, which is here shown connected to ground through smoothing capacitor C3 851 and the load resistor R1 851, but the load at R2 857 is not connected in this representation. A switch can be used to select either of the two output voltages.

FIG. 9 illustrates a cycle of a three-level waveform with a plurality of different states labelled 0, 1, 2, and 3. Above this is a table relating the states to the inputs of the different drivers in FIG. 8. For the front section, for the states 0, 1 IH is high and IL is low; and for the states 2, 3, IL is high and IH is low. In the back section, for states 0, 3 HH and LM are low, and HM and LL are high; and for states 1, 2 HH and LM are high, and HM and LL are low.

In the exemplary embodiment, the three-level rectifiers use a phase locked loop (PLL) to generate timing on low frequency signals to rectify the waveform when delays in the gate drive, logic and analog circuitry are negligible, such as below 1 Mhz; but at higher frequencies, such as at 6.78 MHz, they can degrade the performance of the multi-level rectifier to the point where there is no performance gain with respect to EMI. A multi-level rectifier control circuit 1140 shown in FIG. 11 can provide a control loop, such as provided by the feedback parameter block 1111 and timing generator 1115 of FIG. 11, that can be used to adjust the timing of the edges to compensate for any imperfections. The control loop is generated based on the effects of the timing on the EMI content of the periodic input voltage waveform.

Controlling the level of the third harmonic can be implemented as follows. The third harmonic is a function of the pulse width of the three-level waveform. As long as the pulse width is 60 degrees, there is no third harmonic, regardless of where the pulses are. So adjustment of the width can be used to control the third harmonic, and a third harmonic demodulator can be used to determine how to adjust the timing to reduce the third harmonic. In a real rectifier the pulses are not perfectly square, so the ideal pulse width will deviate slightly from 60 degrees.

It may also be beneficial to control the fifth harmonic. With the waveform in FIG. 5, the fifth harmonic is present, but there are no even harmonics. Shifting the positive and negative pulses (while maintaining the 60 degree width) changes the fifth harmonic level, while having no impact on the third harmonic. With the edges at 48, 168, 192, and 312 degrees as shown in FIG. 6, the third and the fifth harmonics are canceled. The even harmonics start popping up, but for a 6.78 MHz ISM frequency band application the low order even harmonics fall on ISM bands. A fifth harmonic demodulator can be used to detect the phase and magnitude of the fifth harmonic and determine which way to adjust the timing to reduce the fifth harmonic.

With the third and fifth harmonics under control, the even harmonics can be eliminated if desired by using a full-bridge version of the half-bridge in FIG. 8 of the three-level rectifier, resulting in the waveform shown in FIG. 7. Demodulating the second harmonic (as with elements 1203 and 1205 in FIG. 12) can be used to fine tune the 180 degree phase shift needed by the two bridge halves to remove even harmonics. This can provide a significant improvement over reduction of the fifth harmonic.

Figure 10:
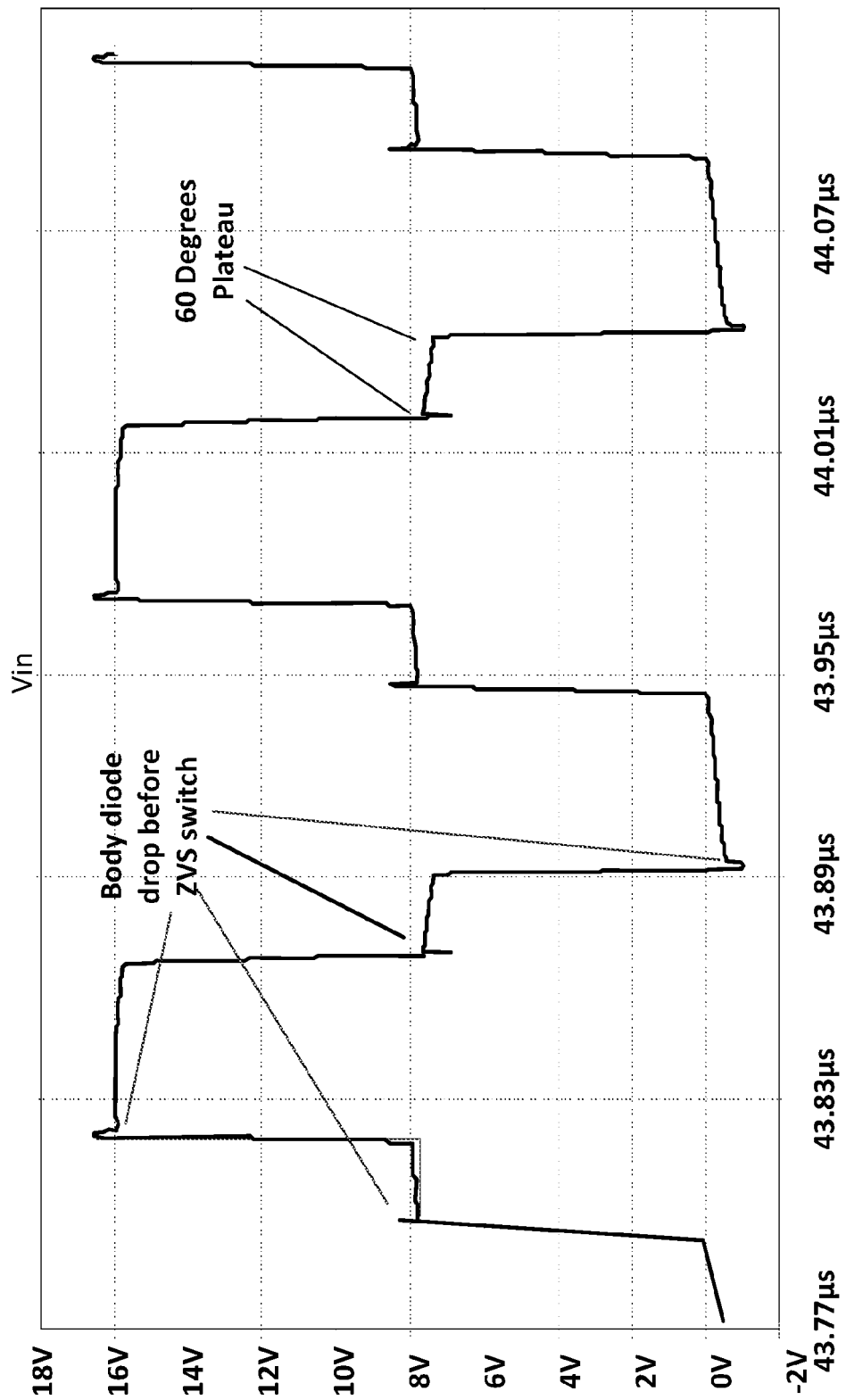
FIG. 10 illustrates a three-level rectifier with zero voltage switching (ZVS).

The addition of a deliberate phase shift between the resonant current and the voltage input to the rectifier zero voltage switching can be achieved by for any of the waveforms discussed here. Zero voltage switching (ZVS) can reduce high order EMI and improve efficiency. FIG. 10 shows an example of the zero voltage switching waveform at the input of a rectifier, such as Vin of FIG. 10, when the rectifier 1000 is operating with a waveform such as that illustrated with respect to FIG. 9.

In the example of FIG. 11, a wireless charging system 1100 includes a rectifier 1102. Rectifier 1102 can be active or synchronous. Rectifier 1102 may receive its input (e.g., a periodic input voltage waveform) from a receive coupler that includes a coupling receive inductor 1131 and a filter 1133. Filter 1133 may include various filtering elements. The periodic input voltage waveform, Vres, at the input of rectifier 1102 is thus a filtered signal from the receive coupler and rectifier 1102 generates the output, Vrect, from that filtered signal. Control signals IH, IL, HH, HM, LM, and LL are provided to rectifier 1102. A multi-level rectifier control circuit 1140 is configured to generate the control signals as explained in more detail below. Those control signals are applied to gate drivers within rectifier 1102 to represent a multi-level switching waveform or its states by switching control circuitry 1103. The switching waveform is provided by a timing generator 1115 as part of the multi-level rectifier control circuit 1140 based on parameters provided from a feedback parameter block 1111 of the multi-level rectifier control circuit 1140 that, based on the current and voltage waveforms supplied to the rectifier, generates the control signals used in generating the switching waveforms that control the rectifier's switches. In this example, the parameters are a clock, a separation adjustment parameter, and width adjustment parameter. Those parameters can be used to correct for phase, second harmonic, and third harmonic, respectively. Feedback parameter block 1111 includes a phase locked loop (PLL) 1113 and is connected to the input Vres of rectifier 1102 to sense its voltage and the current going to rectifier 1102. Current can be sensed by current sensing loop 1117. With respect to sensing the voltage, the exemplary embodiments described here use Vin as the input to the feedback parameter block 1111, but in other arrangements the input voltage can be scaled down by a voltage divider before going to the feedback parameter block 1111.

FIG. 12 shows an example of the feedback parameter block 1111 of the multi-level rectifier control circuit 1140 in more detail. The voltage sense from Vres is connected to a low pass filter LPF 1201 and then to PLL 1213. The fundamental frequency of the input signal in this example is taken as 6.78 MHz, but other frequencies are possible. The filter voltage from LPF 1201 is also supplied to a phase detector 1209, as is the current sense result, to determine the current, voltage synchronization and to generate a control signal for a phase shift block 1215. The output of the phase detector 1209 can be connected to ground through a capacitor 1221 to act as a loop filter. The phase shift block 1215 also receives a 6× clock from PLL 1213 and generates the CLK signal.

The phase feedback correction loop generating the clock signal aligns the voltage and current waveforms at the rectifier input. A deliberate phase offset between current and voltage may be deliberately introduced in this control loop in order to allow for soft switching of the rectifier. The implementation may take the form of a current sensor and voltage sensor as in this example. The implementation may also take the form of synchronization during the dead time by waiting for commutation before continuing to sequence though the steps in the multi-level waveform.

To generate the separation adjust, the output of LPF 1201 goes to phase shift block 1203, whose output is sent to mixer 1205. The mixer 1205 also receives a 2× clock signal having a frequency corresponding to a harmonic of the fundamental (13.56 MHz here) from PLL 1213 and provides the separation adjust signal through low pass filter 1207. The separation adjust controls the width of the state 2, at the expense of the state 0 (e.g., such the timing of the states is adjusted based on a signal indicative of this harmonic present in the input signal).

A balanced rectifier, such as a voltage doubler rectifier or a full bridge rectifier, does not normally generate even harmonics. However imperfections in the timing of the synchronous rectifier can cause some second harmonic. When, as in the exemplary application, the second harmonic of the application falls on an ISM band, the need to correct the second harmonic in a wireless power system is not of critical importance. However correcting it is likely to be useful for elimination of higher order harmonics.

The second harmonic can be corrected by demodulating the input voltage waveform to extract its second harmonic content. The mixer 1205 receives a reference clock with a frequency at twice the fundamental (13.56 MHz in the example) from the PLL 1213 that is synchronized to the clock controlling the rectifier on one input, and a phase shifted version of the input voltage (from phase shift block 1203). The superposition of adding these at 1205 will result in a signal that indicates which direction the positive and negative half cycles need to be moved to cancel the second harmonic.

The required phase shift would make the separation adjustment output of the mixer proportional to the required adjustment needed. The separation adjustment primarily affects the second and fifth harmonics, where correcting the second harmonic is at the expense of the fifth harmonic, and correcting the fifth harmonic is at the expense of the second.

The output of LPF 1201 is also received at phase shift block 1215, whose output then goes to mixer 1217. Mixer 1217 also receives a 3× clock signal having a frequency at a harmonic of the fundamental (20.3 MHz in this example) from PLL 1213 and provides the width adjust signal through a low pass filter 1219. Width adjust controls the width of the positive and negative going pulses; that is, the width of states 1 and 3, at the expense of the width of state 0 and state 2 (e.g., such that the timing of states is adjusted based on the signal indicative of this harmonic in the input). The width adjust primarily affects the third harmonic The third harmonic will be canceled as long as the positive pulse and the negative pulse are 60 degrees wide, compensated for rise and fall times. Demodulation of the third harmonic allows the width of the pulses to be adjusted until the third harmonic is cancelled, regardless of dead time and delays within the circuit. The third harmonic correction loop works the same way as the second, with the exception that the width of the pulses (states 1 and 3) is adjusted.

Figure 13:
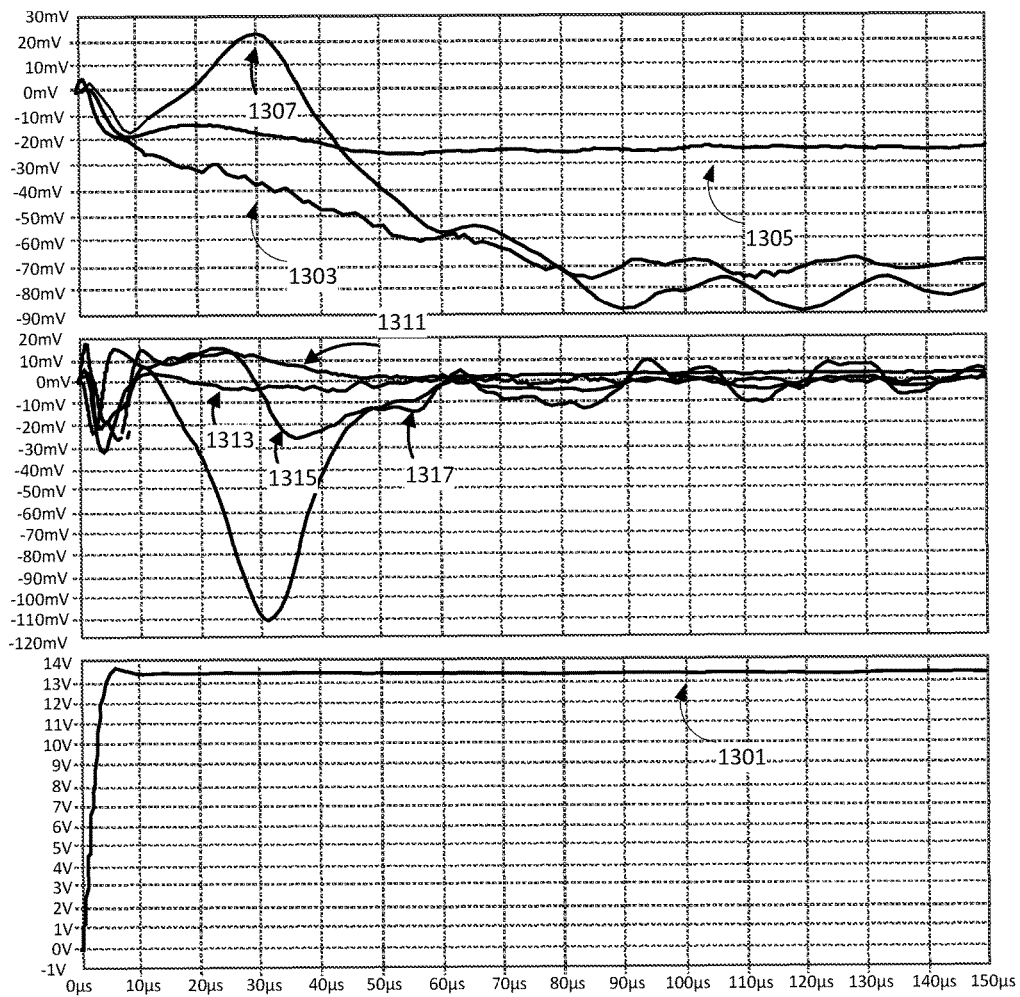
FIG. 13 shows simulation results with the second and third harmonics and control loop outputs.

FIG. 13 illustrates the elimination of the third harmonic as the control loop adjusts to cancel it. FIG. 13 shows simulation results with the second and third harmonics and control loop outputs. FIG. 13 shows a simulation result for a circuit base on that of FIGS. 11 and 12 for the second and third harmonics and control loop outputs. The bottom trace 1301 shows the rectifier's output ramping up and settling at around 13 V. The traces in the top are the phase error 1303, separation adjustment 1305, and width adjustment 1307. The center set of traces show the demodulated second and third harmonics. The traces 1311 and 1313 respectively show the in-phase and quadrature traces for the second harmonic. The traces 1315 and 1317 respectively show the in-phase and quadrature traces of the third harmonic. As shown, after about 60 μs these levels converge to near 0 mV. The phase shift blocks 1203 and 1211 of FIG. 12 are used to demodulate the indication of error in the mixers 1205 and 1217 for the second and third harmonics, respectively.

To further illustrate an example of aspects of an embodiment, as described with reference to FIGS. 11 and 12, a rectification circuit 1100 includes a synchronous rectifier such as the three-level rectifier 1102 is coupled to an input 1117 to receive a periodic input voltage waveform. The synchronous rectifier 1102 includes a plurality of switches and is configured to output a first rectifier output voltage generated from the periodic input voltage waveform. The rectification circuit 1100 further includes a multi-level rectifier control circuit 1140 configured to generate control signals (e.g., output from switching control circuit 1103) coupled to and configured to selectively actuate the plurality of switches in different actuation configurations. The multi-level rectifier control circuit 1140 is configured to cycle through a plurality of different states within a period (e.g., cycle) of the periodic input voltage waveform where each state of the plurality of different states corresponds to adjustment of the control signals (e.g., via switching circuit 1103) that adjust the actuation configurations of the plurality of switches. Each state of the plurality of different states causes a voltage level of the periodic input voltage waveform to be at one of at least three different voltage levels (e.g., the multiple levels as described above). The multi-level rectifier control circuit 1140 is electrically coupled to the input Vin 1117 and is further configured to adjust timing of switching between the plurality of different states based on one or more characteristics of electrical current or voltage levels at the input.

As an example, the one or more characteristics can correspond to indications of one or more harmonics of the fundamental frequency of the periodic input voltage waveform or combination of phase information and information regarding the amount of harmonic content. The multi-level rectifier control circuit 1140 may be configured to adjust the timing of the switching between the plurality of different states to reduce the one or more harmonics.

More particularly, with respect to FIG. 12, the multi-level rectifier control circuit 1140 can include a mixer 1205 configured to receive a first signal having a first frequency at a harmonic of the fundamental frequency and a second signal based on the periodic input voltage waveform at the fundamental frequency. The multi-level rectifier control circuit 1140 is configured to adjust the timing of one of the states of the plurality of different states based on an output of the mixer 1205. Stated another way, the multi-level rectifier control circuit 1140 is configured to demodulate the one or more harmonics of the periodic input voltage waveform and adjust the timing of one of the states of the plurality of different states based on the demodulation.

In one aspect, the plurality of different states may include: a first intermediate state corresponding to one of the at least three different voltage levels; a high state corresponding to one of the at least three different voltage levels; a second intermediate state corresponding to one of the at least three different voltage levels; and a low state corresponding to one of the at least three different voltage levels. The multi-level rectifier control circuit 1140 adjusts a width of the high state and a width of the low state to reduce, for example, a third harmonic of the periodic input voltage waveform. In addition, the multi-level rectifier control circuit can adjust a separation of the high and low states to reduce a second harmonic of the input waveform.

The rectification circuit 1100 can be part of a receive circuit for wireless power transfer and the periodic input voltage waveform is output by a receive coupler 1131 of the receive circuit configured to generate the periodic input voltage waveform in response a magnetic field generated by a transmitter.

If using the rectifier topology as shown in FIG. 8, the three-level rectifier 1102 may include a front section 802 including a first switch 801, connected between a first intermediate node and the input, and a second switch 803, connected between the input and a second intermediate node, where a capacitance 841 is connected between the first and second intermediate nodes. The three-level rectifier 1102 may further includes a back section 804, including: a third switch 821 connected between a first output node and the first intermediate node; a fourth switch 823 connected between the first intermediate node and a third intermediate node; a fifth switch 825 connected between the third intermediate node and the second intermediate node; and a sixth switch 827 connected between the second intermediate node and ground. The rectifier output voltage is taken from the first output node Vrect.

The three-level rectifier 1102 is connected to provide a second rectifier output voltage from the third intermediate node (e.g., at Vmid).

The multi-level rectifier control circuit 1140 includes a phase locked loop 1213 (FIG. 12) configured to maintain a phase of control signals relative to the periodic input voltage waveform.

Furthermore, a method of providing an output voltage from a periodic input voltage waveform while reducing harmonics in the periodic input voltage waveform is provided in accordance with an exemplary embodiment. The method includes rectifying, via a synchronous rectifier circuit comprising a plurality of switches, the periodic input voltage waveform to generate the output voltage. The method further includes generating control signals coupled to selectively actuate the plurality of switches in different switching configurations to cycle through a plurality of different states within a period of the periodic input voltage waveform. Each state of the plurality of different states causes a voltage level of the periodic input voltage waveform to be at one of at least three different voltage levels. The method further includes adjusting the timing of switching between the plurality of different states based on one or more characteristics of electrical current or voltage levels of the periodic input voltage waveform.

In another aspect, a rectification apparatus is provided that includes means for rectifying a periodic input voltage waveform to generate an output voltage. The means for rectifying, for example, may correspond to the three-level rectifier 1102 shown in FIG. 11. The rectification apparatus further includes means for cycling through a plurality of different states within a period of the periodic input voltage waveform. The means for cycling through the plurality of different states may correspond to the multi-level control circuit 1140 of FIG. 11. Each state of the plurality of different states causes a voltage level of the periodic input voltage waveform to be at one of at least three different voltage levels. The rectification apparatus further includes means for adjusting the timing of switching between the plurality of different states based on one or more characteristics of electrical current or voltage levels of the periodic input voltage waveform. The means for adjusting the timing may also correspond to the multi-level control circuit 1140 of FIG. 11.

In accordance with aspects embodiments described herein an apparatus for wireless power transfer is provided that includes a receive circuit comprising a coil (e.g., receive inductor 1131 of FIG. 11) configured to generate a periodic input voltage waveform in response to an external magnetic field generated by a transmitter. The apparatus further includes a multi-level rectification circuit such as the three-level rectifier 1102 of FIG. 11 coupled to the receive circuit to receive the periodic input voltage waveform therefrom at an input and output a voltage for powering or charging a load. The multi-level rectification circuit includes a plurality of switches controlled to cause at least three voltage levels at the input of the multi-level rectification circuit where each of the at least three voltage levels corresponding to one of a plurality of different states of the plurality of switches. The apparatus includes a feedback circuit, such as the feedback block 1111 of the multi-level control circuit 1140 of FIG. 11 that is coupled to the receive circuit and configured to output one or more signals indicative of one or more harmonics of the periodic input voltage waveform. The apparatus further includes a multi-level rectifier control circuit 1140 configured to adjust the timing of switching between the plurality of different states based on the one or more signals indicative of the harmonics.

The various operations of methods performed by the apparatus or system described above may be performed by any suitable means capable of performing the operations, such as various hardware and/or software component(s), circuits, and/or module(s). Generally, any operations or components illustrated in the Figures may be performed or replaced by corresponding functional means capable of performing the operations of the illustrated components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such embodiment decisions may not be interpreted as causing a departure from the scope of the embodiments presented here.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular embodiment. Thus, the various aspects described here may be embodied or carried out in a manner that achieves or optimizes one advantage or group of advantages as taught herein without necessarily achieving other advantages as may be taught or suggested herein.

Components, functional or otherwise, shown in the figures and/or discussed herein as being electrically connected, electrically coupled, or communicating with each other are communicatively coupled. That is, they may be directly or indirectly connected to enable communication or other transfer of signals between them.

A description that an item, such as an embodiment, is exemplary is an indication that the item being described is an example. The use of the term "exemplary" does not necessarily indicate that the item being described is better than or preferred over other items, e.g., other embodiments.

Various modifications of the above described embodiments will be readily apparent, and the generic principles defined herein may be applied to other embodiments without departing from the spirit or scope of the disclosure. Thus, the disclosure is not limited to the implementations shown herein but is to be accorded the widest scope consistent with the principles and novel features disclosed herein.

What is claimed is:

1. A rectification circuit comprising:
a synchronous rectifier electrically coupled to an input to receive a periodic input voltage waveform and comprising a plurality of switches, the synchronous rectifier configured to produce a first rectifier output voltage from the periodic input voltage waveform and to output the first rectifier output voltage; and
a multi-level rectifier control circuit electrically coupled to the synchronous rectifier and configured to produce and provide control signals to the synchronous rectifier to selectively actuate the plurality of switches in different actuation configurations, the multi-level rectifier control circuit configured to cycle through a plurality of different states within a period of the periodic input voltage waveform, each state of the plurality of different states corresponding to respective settings of the control signals that set the actuation configurations of the plurality of switches, wherein each state of the plurality of different states causes a voltage level of the periodic input voltage waveform to be at one of at least three different voltage levels, wherein
the multi-level rectifier control circuit is electrically coupled to the input and is further configured to adjust timing of switching between the plurality of different states based on one or more characteristics, the one or more characteristics being of electrical current at the input, or voltage levels at the input, or a combination thereof.

2. The rectification circuit of claim 1, wherein the periodic input voltage waveform has a fundamental frequency, and wherein the one or more characteristics correspond to indications of one or more harmonics of the fundamental frequency of the periodic input voltage waveform.

3. The rectification circuit of claim 2, wherein the multi-level rectifier control circuit comprises a mixer configured to receive a first signal having a first frequency at a harmonic of the fundamental frequency and a second signal based on the periodic input voltage waveform at the fundamental frequency, wherein the multi-level rectifier control circuit is configured to adjust the timing of one of the states of the plurality of different states based on an output of the mixer.

4. The rectification circuit of claim 2, wherein the multi-level rectifier control circuit is configured to adjust the timing of the switching between the plurality of different states to reduce the one or more harmonics.

5. The rectification circuit of claim 2, wherein the multi-level rectifier control circuit is configured to perform demodulation of the one or more harmonics of the periodic input voltage waveform, wherein the multi-level rectifier control circuit is configured to adjust the timing of one of the states of the plurality of different states based on the demodulation.

6. The rectification circuit of claim 1, wherein the plurality of different states include:
a first intermediate state corresponding to one of the at least three different voltage levels;
a high state corresponding to one of the at least three different voltage levels;
a second intermediate state corresponding to one of the at least three different voltage levels; and
a low state corresponding to one of the at least three different voltage levels,
wherein the multi-level rectifier control circuit is configured to adjust a widths of the high state and a width of the low state to reduce a third harmonic of the periodic input voltage waveform.

7. The rectification circuit of claim 1, wherein the plurality of different states include:
a first intermediate state corresponding to one of the at least three different voltage levels;
a high state corresponding to one of the at least three different voltage levels;
a second intermediate state corresponding to one of the at least three different voltage levels; and
a low state corresponding to one of the at least three different voltage levels,
wherein the multi-level rectifier control circuit is configured to adjust a separation of the high state and the low state to reduce a second harmonic of the input waveform.

8. The rectification circuit of claim 1, wherein the rectification circuit is part of a receive circuit for wireless power transfer and the synchronous rectifier is configured to receive the periodic input voltage waveform from a receive coupler of the receive circuit configured to produce the periodic input voltage waveform in response to a magnetic field produced by a transmitter.

9. The rectification circuit of claim 1, wherein the synchronous rectifier comprises:
a front section including:
a) a first switch, connected between a first intermediate node and the input, and
b) a second switch, connected between the input and a second intermediate node;
a capacitance connected between the first and second intermediate nodes; and
a back section including:
a) a third switch connected between a first output node and the first intermediate node;
b) a fourth switch connected between the first intermediate node and a third intermediate node;
c) a fifth switch connected between the third intermediate node and the second intermediate node; and d) a sixth switch connected between the second intermediate node and ground,
wherein the rectifier output voltage is taken from the first output node.

10. The rectification circuit of claim 9, wherein the synchronous rectifier is connected to provide a second rectifier output voltage from the third intermediate node.

11. The rectification circuit of claim 1, wherein the multi-level rectifier control circuit comprises a phase locked loop configured to maintain a phase of control signals relative to the periodic input voltage waveform.

12. A method of providing an output voltage from a periodic input voltage waveform while reducing harmonics in the periodic input voltage waveform, the method comprising:
rectifying, via a synchronous rectifier circuit comprising a plurality of switches, the periodic input voltage waveform to produce the output voltage;
producing control signals coupled to selectively actuate the plurality of switches in different switching configurations to cycle through a plurality of different states within a period of the periodic input voltage waveform, wherein each state of the plurality of different states causes a voltage level of the periodic input voltage waveform to be at one of at least three different voltage levels; and
adjusting the timing of switching between the plurality of different states based on one or more characteristics, the one or more characteristics being of electrical current of the periodic input voltage waveform or voltage levels of the periodic input voltage waveform, or a combination thereof.

13. The method of claim 12, wherein the periodic input voltage waveform has a fundamental frequency, and wherein the one or more characteristics correspond to indications of levels of one or more harmonics of the fundamental frequency of the periodic input voltage waveform.

14. The method of claim 13, further comprising mixing a first signal having a first frequency at a harmonic of the fundamental frequency and a second signal based on the periodic input voltage waveform at the fundamental frequency, and wherein the one or more characteristics correspond to an output of the mixing wherein adjusting the timing of switching between the plurality of different states is based on the output of the mixing.

15. The method of claim 13, wherein adjusting the timing comprises adjusting the timing of the switching between the plurality of different states to reduce the one or more harmonics.

16. The method of claim 13, further comprising demodulating the one or more harmonics of the periodic input voltage waveform, wherein the one or more characteristics correspond to an output of the demodulating.

17. The method of claim 12, wherein the plurality of different states include:
a first intermediate state corresponding to one of the at least three different voltage levels;
a high state corresponding to one of the at least three different voltage levels;
a second intermediate state corresponding to one of the at least three different voltage levels; and
a low state corresponding to one of the at least three different voltage levels,
wherein adjusting the timing comprises adjusting a width of the high state and a width of the low state to reduce a third harmonic of the periodic input voltage waveform.

18. The method of claim 12, wherein the plurality of different states include:
a first intermediate state corresponding to one of the at least three different voltage levels;
a high state corresponding to one of the at least three different voltage levels;
a second intermediate state corresponding to one of the at least three different voltage levels; and
a low state corresponding to one of the at least three different voltage levels,
wherein adjusting the timing comprises adjusting a separation of the high state and the low state to reduce a second harmonic of the input waveform.

19. The method of claim 12, further comprising producing the periodic input voltage waveform via a receive circuit for wireless power transfer coupling power via a magnetic field.

20. The method of claim 12, further comprising maintaining the phase of the control signals relative to the periodic input voltage waveform.

21. A rectification apparatus comprising:
means for rectifying a periodic input voltage waveform to produce an output voltage;
means for cycling through a plurality of different states within a period of the periodic input voltage waveform, wherein each state of the plurality of different states causes a voltage level of the periodic input voltage waveform to be at one of at least three different voltage levels; and
means for adjusting the timing of switching between the plurality of different states based on one or more characteristics, the one or more characteristics being of electrical current of the periodic input voltage waveform, or voltage levels of the periodic input voltage waveform, or a combination thereof.

22. The rectification apparatus of claim 21, wherein the periodic input voltage waveform has a fundamental frequency, and wherein the one or more characteristics correspond to indications of levels of one or more harmonics of the fundamental frequency of the periodic input voltage waveform.

23. The rectification apparatus of claim 22, further comprising means for mixing a first signal having a first frequency at a harmonic of the fundamental frequency and a second signal based on the periodic input voltage waveform at the fundamental frequency, and wherein the one or more characteristics correspond to an output of the means for mixing.

24. The rectification apparatus of claim 22, further comprising means for demodulating the one or more harmonics of the periodic input voltage waveform, wherein the one or more characteristics correspond to an output of the means for demodulating.

25. The rectification apparatus of claim 21, wherein the plurality of different states include:
a first intermediate state corresponding to one of the at least three different voltage levels;
a high state corresponding to one of the at least three different voltage levels;
a second intermediate state corresponding to one of the at least three different voltage levels; and
a low state corresponding to one of the at least three different voltage levels,
wherein the means for adjusting the timing comprises means for adjusting a width of the high state and a width of the low state to reduce a third harmonic of the periodic input voltage waveform and means for adjusting a separation of the high state and the low state to reduce a second harmonic of the input waveform.

26. The rectification apparatus of claim 21, further comprising means for wirelessly receiving power via a magnetic field to generate the periodic input voltage waveform.

27. An apparatus for wireless power transfer, the apparatus comprising:
a receive circuit comprising a coil configured to generate a periodic input voltage waveform in response to an external magnetic field generated by a transmitter; and
a multi-level rectification circuit coupled to the receive circuit to receive the periodic input voltage waveform therefrom at an input and configured to output a voltage for powering or charging a load, the multi-level rectification circuit including a plurality of switches controlled to cause at least three voltage levels at the input of the multi-level rectification circuit, each of the at least three voltage levels corresponding to one of a plurality of different states of the plurality of switches; and
a feedback circuit coupled to the receive circuit and configured to output one or more signals indicative of one or more harmonics of the periodic input voltage waveform; and
a multi-level rectifier control circuit configured to adjust the timing of switching between the plurality of different states based on the one or more signals indicative of the harmonics.

28. The apparatus of claim 27, wherein the plurality of different states include:
a first intermediate state corresponding to one of the at least three different voltage levels;
a high state corresponding to one of the at least three different voltage levels;
a second intermediate state corresponding to one of the at least three different voltage levels; and
a low state corresponding to one of the at least three different voltage levels,
wherein the multi-level rectifier control circuit is configured to adjust a width of the high state and a width of the low state to reduce a third harmonic of the periodic input voltage waveform, and wherein the multi-level rectifier control circuit is further configured to adjust a separation of the high state and the low state to reduce a second harmonic of the periodic input voltage waveform.

29. The apparatus of claim 27, wherein the multi-level rectification circuit comprises:
a front section including:
a) a first switch, connected between a first intermediate node and the input, and
b) a second switch, connected between the input and a second intermediate node;
a capacitance connected between the first and second intermediate nodes; and
a back section, including:
a) a third switch connected between a first output node and the first intermediate node;
b) a fourth switch connected between the first intermediate node and a third intermediate node;
c) a fifth switch connected between the third intermediate node and the second intermediate node; and
d) a sixth switch connected between the second intermediate node and ground,
wherein the rectifier output voltage is taken from the first output node.

* * * * *